United States Patent
Sanzone et al.

(10) Patent No.: US 11,685,546 B2
(45) Date of Patent: Jun. 27, 2023

(54) HIGH-SPEED REJECTED TAKEOFF DETECTION

(71) Applicant: The Boeing Company, Chicago, IL (US)

(72) Inventors: Andrea Sanzone, Frankfurt (DE); Rahul Ashok, Singapore (SG); Rowena Loh, Singapore (SG); Garoe Gonzalez, Las Palmas (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/473,300

(22) Filed: Sep. 13, 2021

(65) Prior Publication Data
US 2023/0084569 A1 Mar. 16, 2023

(51) Int. Cl.
*B64D 43/00* (2006.01)
*G06N 20/00* (2019.01)
*G08G 5/00* (2006.01)

(52) U.S. Cl.
CPC ............ *B64D 43/00* (2013.01); *G06N 20/00* (2019.01); *G08G 5/0021* (2013.01); *G08G 5/0026* (2013.01)

(58) Field of Classification Search
None
See application file for complete search history.

(56) References Cited

U.S. PATENT DOCUMENTS

| | | | |
|---|---|---|---|
| 2018/0155052 A1* | 6/2018 | Lacroix | G08G 5/0082 |
| 2019/0072982 A1* | 3/2019 | Guedes | G01C 23/00 |
| 2019/0106089 A1* | 4/2019 | Pandey | B60T 7/12 |
| 2019/0276160 A1* | 9/2019 | Kipersztok | G05D 1/0661 |

OTHER PUBLICATIONS

Airbus, Flight Operations Briefing Notes—Takeoff and Departure Operations—Revisiting the 'Stop or Go' Decision Accessed on the Internet on Sep. 13, 2021 at: https://www.smartcockpit.com/docs/Stop_and_No_Go_Decision.pdf, 11 pages.
Aopa Pilot Protection, by Ray Carver, "Occurrence Investigations," Accessed on the Internet on Sep. 13, 2021 at: https://pilot-protection-services.aopa.org/news/2018/july/01/occurrence-investigations, 4 pages.
(Continued)

*Primary Examiner* — Brent Swarthout
(74) *Attorney, Agent, or Firm* — Sage Patent Group (57) ABSTRACT

A method includes detecting, by a processing circuit, a high-speed rejected takeoff has occurred by determining an aircraft has accelerated to at least a first preset indicated airspeed value and then by determining the aircraft has decelerated below at least a second preset indicated airspeed value and the aircraft is on the ground. The method also includes detecting, by the processing circuit, an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne.

20 Claims, 7 Drawing Sheets

(56) References Cited

OTHER PUBLICATIONS

Federal Aviation Administration, "Takeoff Safety Training Guide—Section 2—Pilot Guide to Takeoff Safety," Accessed on the Internet on Sep. 13, 2021 at: https://www.faa.gov/other_visit/aviation_industry/airline_operators/training/media/takeoff_safety.pdf, 45 pages.
Skybrary, "Rejected Take Off," Accessed on the Internet on Sep. 13, 2021 as: http://www.skybrary.eu/index.php/Rejected_Take_Off, 11 pages.
Skybrary, "Rejected Take Off: ATC Consideration," Accessed on the Internet on Sep. 13, 2021 at: https://www.skybrary.aero/index.php/Rejected_Take_Off:_ATC_Considerations, 6 pages.
Boeing, "Flight Operations—Rejected Takeoff Studies," Aero Magazine No. 11, Accessed on the Internet on Sep. 13, 2021 at: http://www.boeing.com/commercial/aeromagazine/aero_11/takeoff_story.html, 7 pages.

* cited by examiner

FIG. 6B

HIGH-SPEED REJECTED TAKEOFF DETECTION

FIELD

The present disclosure relates to aircraft and more particularly to a method and system for high-speed rejected takeoff detection.

BACKGROUND

During operation of an aircraft, flight crews need to interface with the different systems of the aircraft, monitor equipment onboard the aircraft, access information, communicate with air traffic controllers, and respond to different events during all phases of a flight among other tasks involved in flying an airplane. Accessing information, monitoring equipment, and responding to certain occurrences, along with actually flying the airplane, can be hectic at times, particularly during high workload situations for the crew.

SUMMARY

In accordance with an example, a method includes detecting, by a processing circuit, a high-speed rejected takeoff has occurred by determining an aircraft has accelerated to at least a first preset indicated airspeed value and then by determining the aircraft has decelerated below at least a second preset indicated airspeed value and the aircraft is on the ground. The method also includes detecting, by the processing circuit, an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne.

In accordance with another example, a system includes a processing circuit and a memory associated with the processing circuit. The memory includes computer-readable program instructions that, when executed by the processing circuit causes the processing circuit to perform a set of functions. The set of functions include detecting a high-speed rejected takeoff has occurred by determining an aircraft has accelerated to at least a first preset indicated airspeed value and then by determining the aircraft has decelerated below at least a second preset indicated airspeed value and the aircraft is on the ground. The set of functions also include detecting an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne.

The features, functions, and advantages that have been discussed can be achieved independently in various examples or may be combined in yet other examples further details of which can be seen with reference to the following description and drawings.

DETAILED DESCRIPTION

The following detailed description of examples refers to the accompanying drawings, which illustrate specific examples of the disclosure. Other examples having different structures and operations do not depart from the scope of the present disclosure. Like reference numerals may refer to the same element or component in the different drawings.

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

According to the International Air Transport Association (IATA) Safety Trend Evaluation, Analysis and Data Exchange System (STEADES) Safety Trend Analysis—2002, eight percent (8%) of rejected takeoffs (RTOs) are performed at high-speed, e.g., above about 100 knots, and ninety-two percent (92%) are performed at low speed, e.g., below about 100 knots. Low speed RTOs are simple maneuvers, associated with low risks, and rarely lead to runway excursions or to runway overruns. However, high-speed RTOs may involve difficult maneuvers that are associated with high risks due to the amount of energy involved, and the necessity to effectively control aircraft braking and the aircraft trajectory on the runway centerline. Runway overruns or excursions mainly occur during high-speed RTOs.

In accordance with some examples of the present disclosure, a method and system implementing the method automatically detect high-speed RTOs. As described in more detail herein, the method and system use data external to the aircraft to automatically detect high-speed RTOs. The use of external data make the method and system scalable and easier to deploy and use. In some examples, the method and system each combine Automatic Dependent Surveillance-Broadcast (ADS-B) signals to monitor aircraft position and speed with geospatial data to confirm presence of the aircraft on the runway. A high-speed RTO is detected in response to an abrupt deceleration of the aircraft after the aircraft has accelerated to a first preset indicated airspeed (IAS) value or threshold within a first preset time limit after an initial condition and the aircraft is still on the ground. All necessary stakeholders are automatically notified in response to detecting the high-speed RTO so the pilots can focus their attention on safety. In some examples, the stakeholders include a predetermined list of entities to which a notification is transmitted in response to detecting a high-speed RTO has occurred. Examples of stakeholders include, but are not necessarily limited to, air traffic control (ATC), airport emergency services, an operations control center (OCC) of an airline, maintenance control for the airline, aircraft manufacturer, government entities, e.g., in the United States, the Federal Aviation Administration (FAA), National Transportation Safety Board (NTSB), etc. The airline maintenance can be ready to perform all necessary checks and other pilots can be warned about runway contamination. The disclosed method and system provides prompt reporting of RTOs for situational awareness and increased safety. Further, the disclosed method and system reduces pilot workload, improves situational awareness, and allows the crew to focus on actual operation and navigation of the aircraft.

Figure 1:
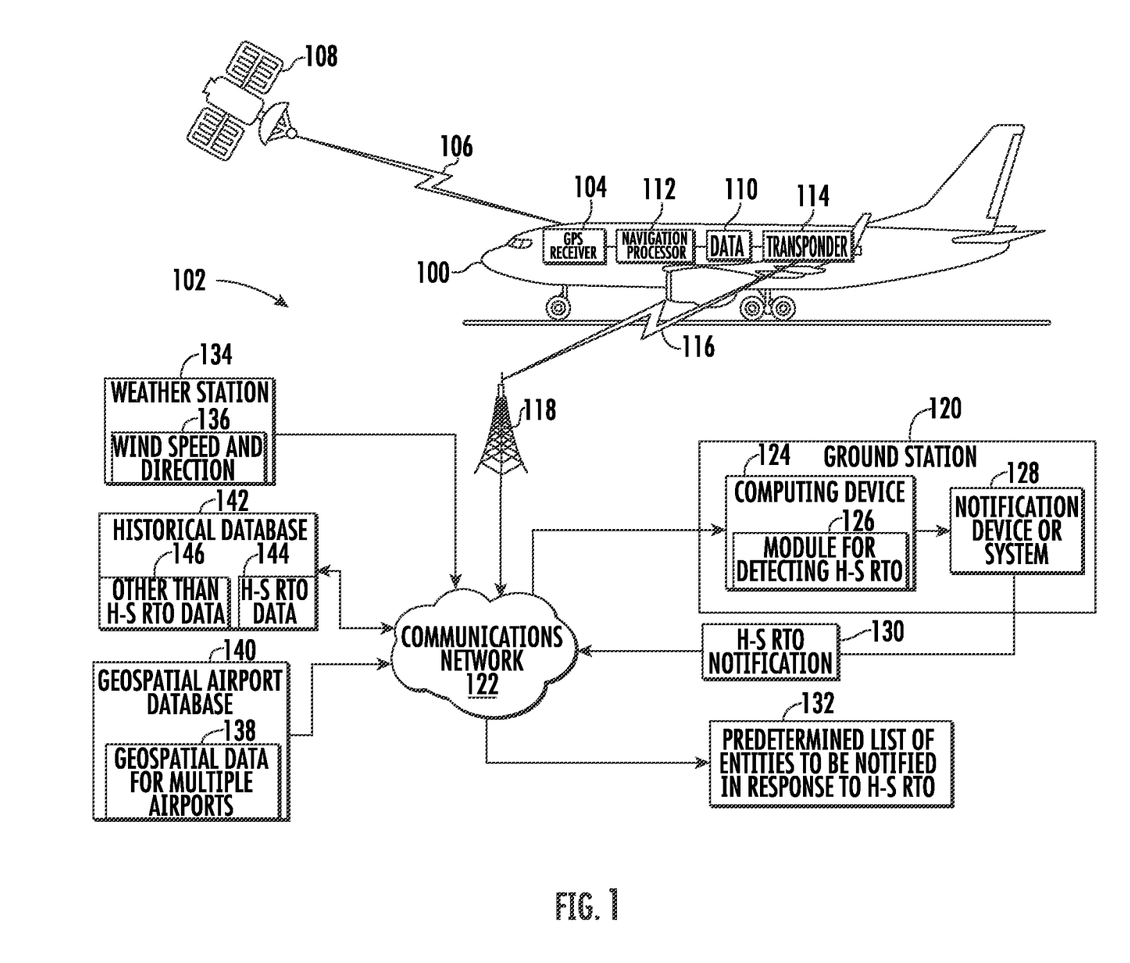
FIG. 1 is a block schematic diagram of an example of an aircraft and a system for rejected takeoff detection in accordance with an example of the present disclosure.

FIG. 1 is a block schematic diagram of an example of an aircraft 100 and a system 102 for rejected takeoff detection in accordance with an example of the present disclosure. The aircraft 100 includes a global positioning system (GPS) receiver 104 for receiving information signals 106 from one or more GPS satellites 108 or a constellation of GPS satellites 108. The information signals 106 include information for determining aircraft location data 110. In some examples, the aircraft location data 110 includes at least a current geographic location, a current altitude, a current direction, and a current speed or ground speed of the aircraft 100. The GPS receiver 104 is connected to a navigation processor 112. The navigation processor 112 is configured to determine the aircraft location data 110 from the information from the GPS receiver 104. The navigation processor 112 transmits the aircraft location data 110 to a transponder 114. The transponder 114 is configured to periodically broadcast a wireless data stream 116. In some example, the wireless data stream 116 is an electromagnetic (EM) data stream, e.g., a radio frequency (RF) data stream or other form of EM data stream. The wireless data stream 116 includes the aircraft location data 110. In some examples, the aircraft location data 110 includes other information pertaining to the aircraft 100. For example, the transponder 114 of the aircraft 100 transmits automatic dependent surveillance-broadcast (ADS-B) signals. In addition to the aircraft location data 110 transmitted by the transponder 114, in some examples, the ADS-B signals include additional information or data associated with the aircraft 100. Examples of the additional information include, but are not necessarily limited to, a current flight identifier of the aircraft 100, a tail number of the aircraft 100, and the model of the aircraft 100. In some examples, the wireless data streams 116 are not limited to ADS-B signals. An example of another type of wireless data stream includes radar signals. The GPS receiver 104 and the navigation processor 112 are continually updating the aircraft location data 110 and the transponder 114 continuously or periodically transmits the wireless data stream 116 or ADS-B signals including the updated aircraft location data 110.

A ground antenna 118 receives the wireless data streams 116 from the aircraft 100. The ground antenna 118 transmits the wireless data streams 116 including the aircraft location data 110 and any other information to a ground station 120 via a communications network 122. The communications network 122 is any type of communications network. In different examples, the communications network 122 is a wireless communications network, wired communication network or combination wireless and wired communications network.

The ground station 120 includes a computing device 124 to receive the aircraft location data 110 and any additional information. The computing device 124 is any type of computing device configured to perform the operations described herein. An example of the computing device 500 used for computing device 124 in some embodiments will be described in more detail with reference to FIG. 5. The computing device 124 includes a module 126 for detecting a high-speed rejected takeoff (H-S RTO). In some examples as described herein, the high-speed rejected takeoff is defined as the aircraft 100 accelerating to a first preset indicated airspeed (IAS), e.g., between about 80 knots and about 100 knots and then decelerating below a second preset IAS, e.g., between about 40 knots and about 20 knots within a preset time limit, e.g., less than about five minutes after reaching the first preset time limit and the aircraft 100 is still on the ground. In accordance with an example, the module 126 embodies a method for detecting a high-speed rejected takeoff. An example of a method 600 for detecting a high-speed rejected takeoff is described with reference to FIGS. 6A-6B. In accordance with some examples, the method 600 is embodied in the module 126 for detecting the high-speed rejected takeoff.

The ground station 120 also includes a notification device or system 128. The computing device 124 is coupled to the notification device or system 128. The notification device or system 128 is configured to transmit a high-speed rejected takeoff (H-S RTO) notification 130 or alert to a predetermined list of entities 132 in response to detecting the high-speed rejected takeoff occurring or being detected. In the example in FIG. 1, the H-S RTO notification 130 is transmitted to the predetermined list of entities via the communications network 122. Similar to that previously described, examples of the entities 132 include, but are not necessarily limited to, air traffic control (ATC), airport emergency services, an operations control center (OCC) of an airline, maintenance control for the airline, aircraft manufacturer, government entities, e.g., in the United States, the Federal Aviation Administration (FAA), National Transportation Safety Board (NTSB), etc.

In accordance with some examples, a weather station 134 provides weather input data to the ground station 120 or computing device 124. The weather input data is used along with other input data by the module 126 for detecting a high-speed rejected takeoff as described herein. In the example in FIG. 1, the ground station 120 or computing device 124 receives the weather input data from the weather station 134 via the communications network 122. Examples of the weather input data from the weather station 134 include, but are not necessarily limited to, wind speed and wind direction data 136 proximate to the aircraft 100. In some examples, the weather input data is provided in a Meteorological Aviation Routine Weather Report or Meteorological Aerodrome Report (METAR). The weather station 134 may be a National Oceanographic and Atmospheric Administration (NOAA) weather center or weather center or station of a similar organization in other countries.

Figure 2:
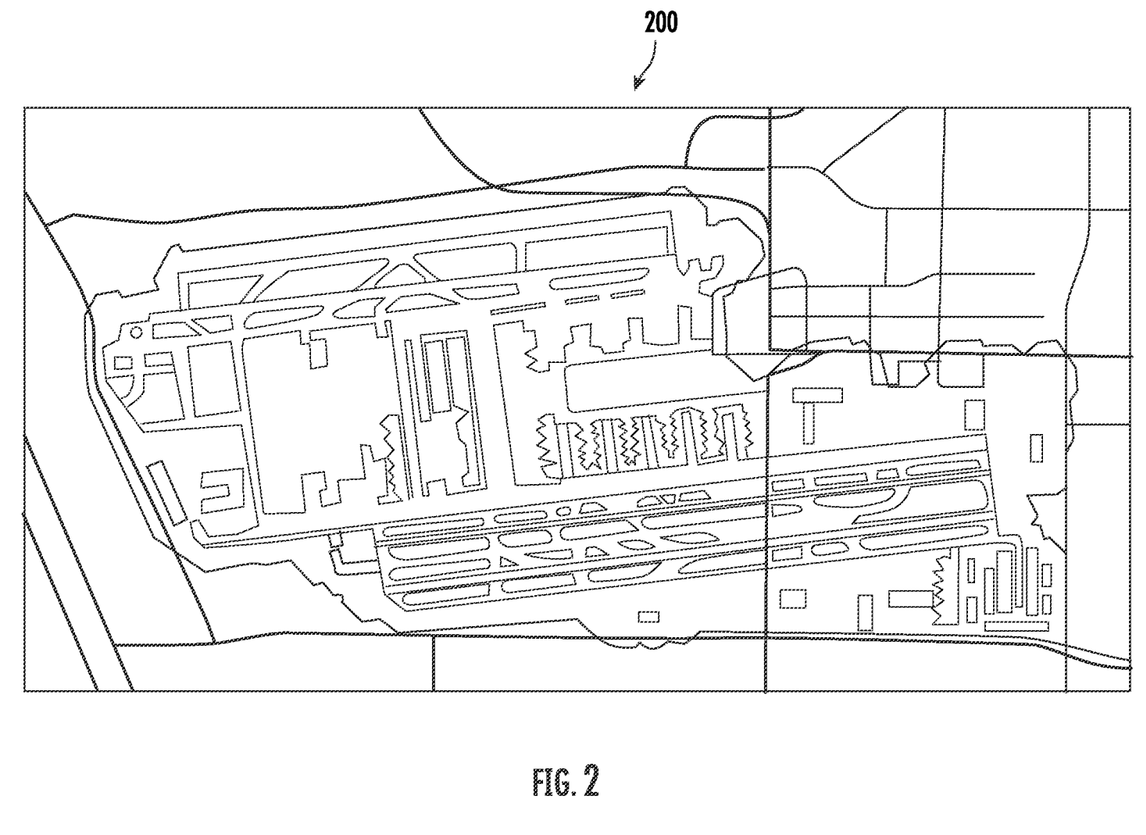
FIG. 2 is an example of a map of an airport generated from geospatial airport data for the airport in accordance with the present disclosure.

In accordance with some examples, the ground station 120 or computing device 124 receives geospatial airport data 138 for the airport where the aircraft 100 is located from a geospatial airport database 140. The geospatial airport data 138 is used along with other input data by the module 126 for detecting a high-speed rejected takeoff as described herein. The geospatial airport database 140 includes geospatial airport data 138 for multiple airports. In the example in FIG. 1, the geospatial airport data 138 is received by the ground station 120 or computing device 124 via the communications network 122. Referring also to FIG. 2, FIG. 2 is an example of a map 200 of an airport generated from geospatial airport data 138 for the airport where the aircraft 100 is located in accordance with the present disclosure.

A historical database 142 receives and stores high-speed rejected takeoff data 144 generated in response to detecting a high-speed rejected takeoff. The historical database 142 also receives and stores other data 146 generated in response to an event other than a high-speed rejected takeoff. Examples of an event other than a high-speed rejected takeoff include, but are not necessarily limited to, an aircraft aborting a takeoff before reaching the first preset IAS value, the aircraft taking off, etc.

Figure 3:
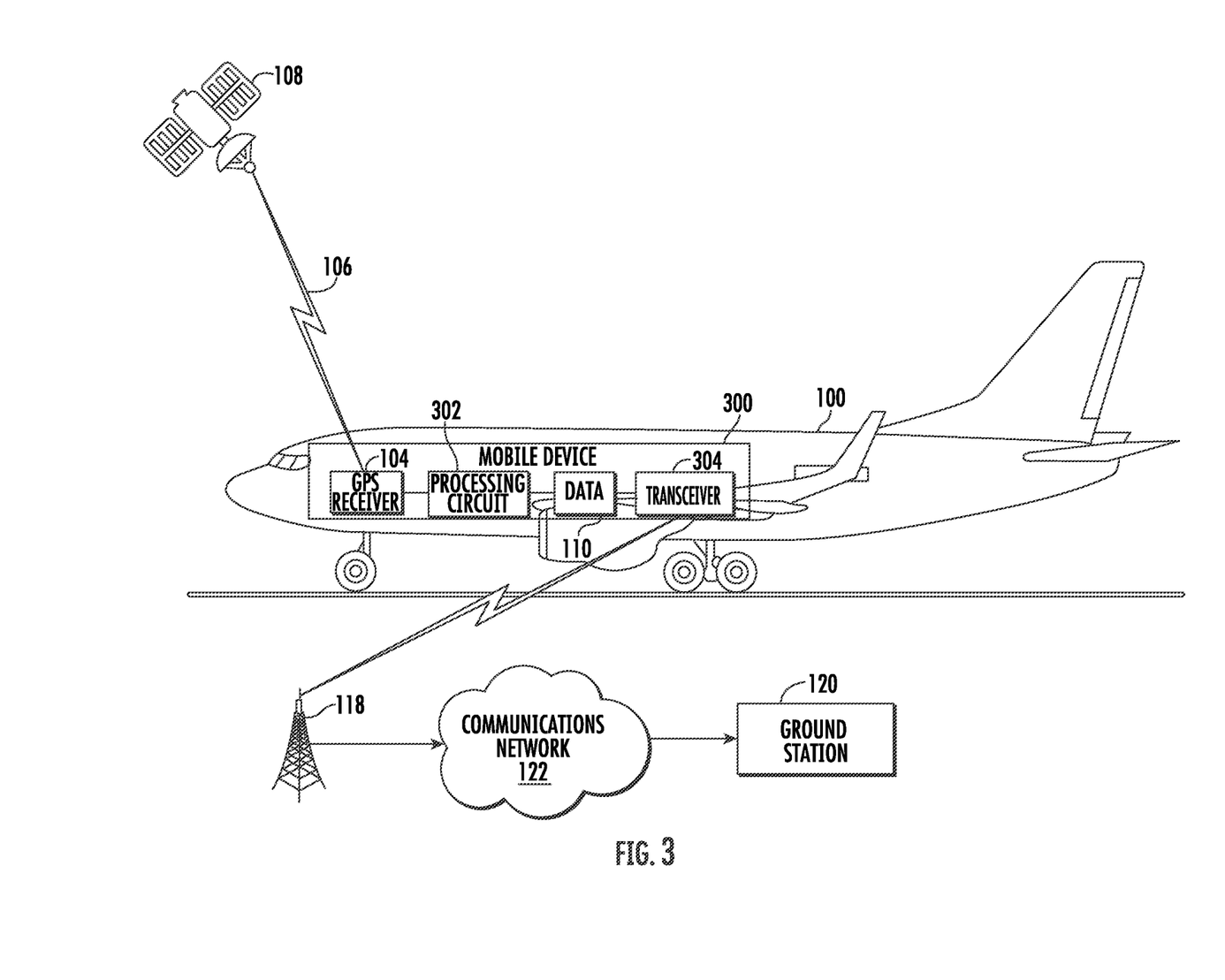
FIG. 3 is a block schematic diagram of an example of a mobile device onboard an aircraft for transmitting aircraft input data to a system for rejected takeoff detection in accordance with an example of the present disclosure.

Referring to FIG. 3, FIG. 3 is a block schematic diagram of an example of a mobile device 300 onboard the aircraft 100 for determining and transmitting aircraft input data to a system 102 for rejected takeoff detection in accordance with an example of the present disclosure. The mobile device 300 includes a GPS receiver 104 for receiving information signals 106 from one or more GPS satellites 108 or a constellation of GPS satellites 108. The information signals 106 include information for determining aircraft location data 110. The mobile device 300 also includes a processing circuit 302 for determining the aircraft location data 110 from the information signals 106. The mobile device 300 also includes a transmitter or transceiver 304 for transmitting the aircraft location data 110 to the ground antenna 118. In the example in FIG. 3, the aircraft location data 110 is received from the mobile device 300 present in a cockpit of the aircraft 100. The example illustrated in FIG. 3 is similar to the example illustrated in FIG. 1 and includes the GPS receiver 104 as a component of the mobile device 300. In other examples, the example illustrated in FIG. 1 additionally includes the mobile device 300 onboard the aircraft 100. The aircraft location data 110 is received from both the mobile device 300 and the wireless data streams 116 or ADS-B signals. The input aircraft data or aircraft location data 110 from the mobile device 300 is used to improve the aircraft input data from the wireless data streams 116 or ADS-B signals.

Figure 4:
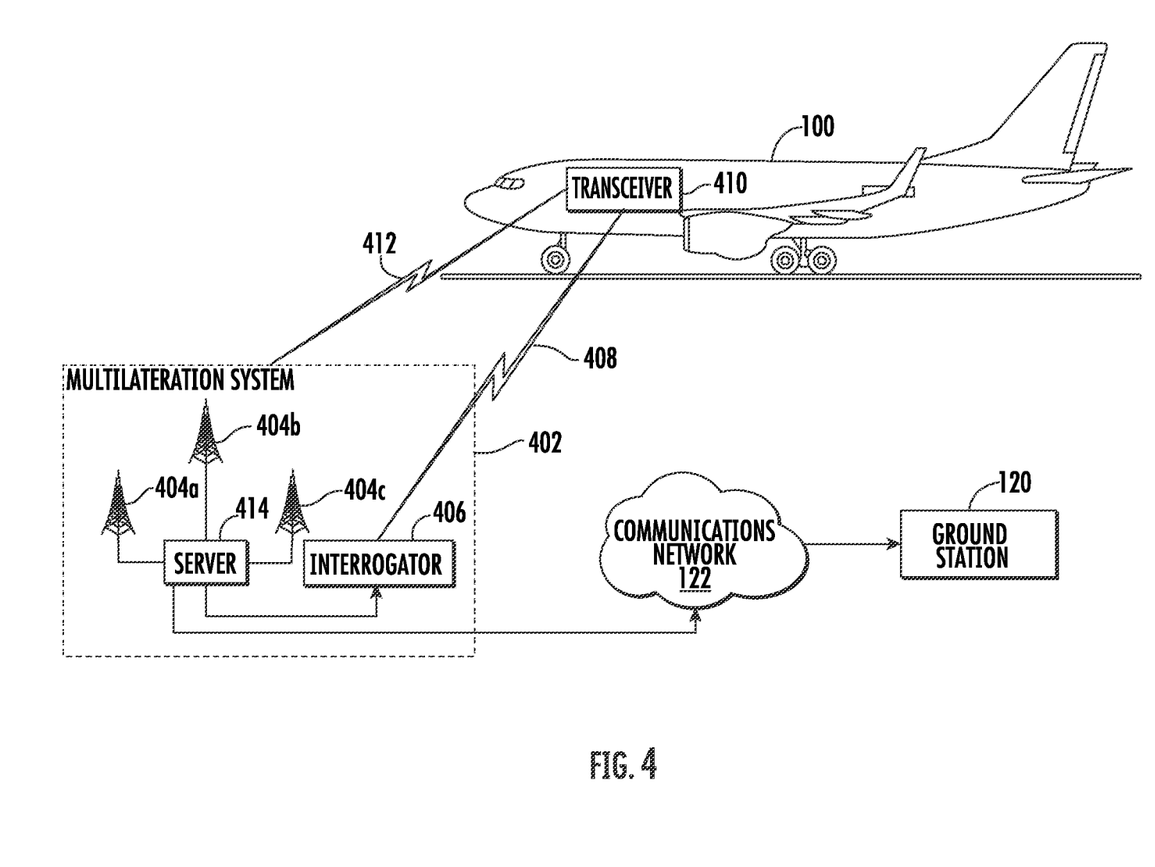
FIG. 4 is a block schematic diagram of an example of a multilateral system for determining the position, speed, direction of flight, and altitude of an aircraft in accordance with an example of the present disclosure.

In accordance with another example, the aircraft location data 110 is received from a multilateration system 402 as illustrated in FIG. 4. FIG. 4 is a block schematic diagram of an example of a multilateral system 402 for determining the position, speed, direction of flight, and altitude of an aircraft in accordance with an example of the present disclosure. The multilateration system 402 includes three or more ground antennas 404a-404c. Each of the ground antennas 404a-404c are positioned at unique locations for determining the aircraft location data 110 as described herein. An interrogator 406 transmits one or more interrogatory signals 408 to a transceiver 410 onboard the aircraft 100. The transceiver 410 generates one or more reply signals 412 in response to receiving the one or more interrogatory signals 408. Each of the ground antennas 404a-404c receives the one or more reply signals 412. The reply signals 412 are received by each of the ground antennas 404a-404c at fractionally different times because of the unique locations of each of the ground antennas 404a-404c. A server 414 determines the aircraft location data by calculating a time difference of arrival (TDOA) between the reply signal or signals 412 received by each of the ground antennas 404a-404c. The server 414 transmits the aircraft location data 110 or aircraft location data stream to the ground station 120 via the communications network 122.

In some examples, receiving input data for detecting a high-speed rejected takeoff includes receiving the aircraft location data 110 from at least one of a GPS receiver 104 onboard the aircraft 100 (FIG. 1), a mobile device 300 (FIG. 3) onboard the aircraft 100, and a multilateration system 402 (FIG. 4). In some examples, aircraft location data 110 received from the mobile device 300 and/or the multilateration system 402 is used to enhance or improve data received from the wireless data streams 116 or ADS-B signals or data streams.

Figure 5:
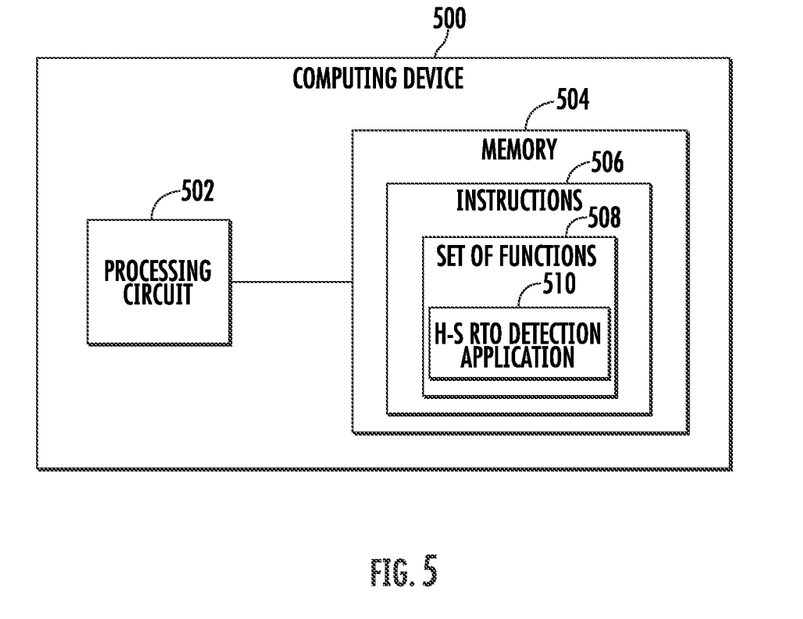
FIG. 5 is a block schematic diagram of an example of a computing device or system in accordance with an example of the present disclosure.

FIG. 5 is a block schematic diagram of an example of a computing device 500 in accordance with an example of the present disclosure. In accordance with some examples, the computing device 500 is used for the computing device 124 of the ground station 120. In other examples, the computing device 124 may be any device capable of performing the functions described herein. The exemplary computing device 500 includes processing circuit 502 and a memory 504 associated with the processing circuit 502. The memory 504 includes computer-readable program instructions 506 that, when executed by the processing circuit 502 causes the processing circuit 502 to perform a set of functions 508. In accordance with some examples, the set of functions 508 define a high-speed rejected takeoff detection (H-S RTO) application 510 or module 126 for detecting a H-S RTO (FIG. 1). In some examples, the set of functions 508, application 510 or module 126 define a method for detecting a high-speed rejected takeoff. An example of a method 600 for detecting a high-speed rejected takeoff including the set of functions 508 is described with reference to FIGS. 6A-6B.

Figure 6A:
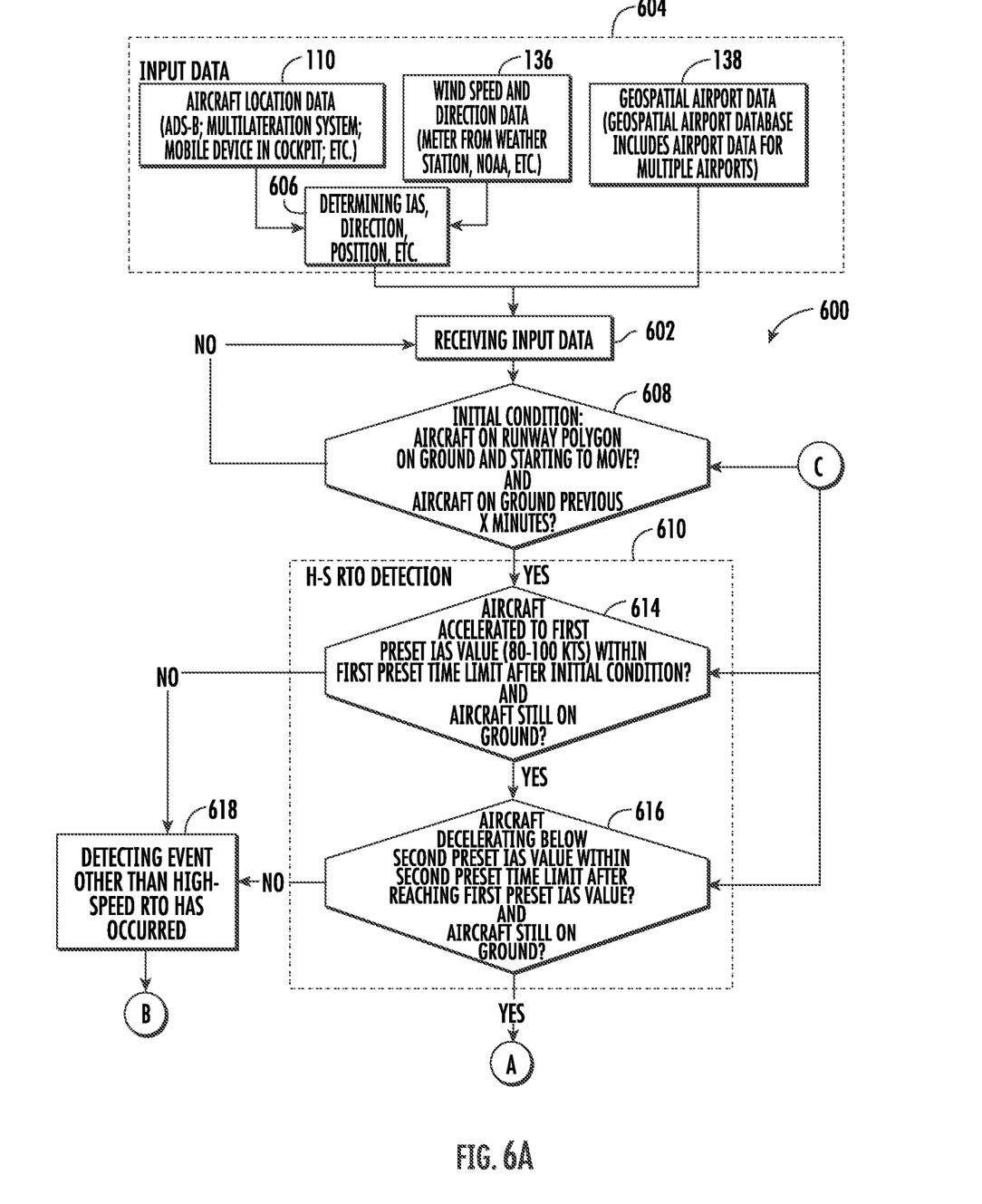
FIGS. 6A-6B are a flow chart of an example of a method for high-speed rejected takeoff detection in accordance with an example of the present disclosure.
Figure 6B:
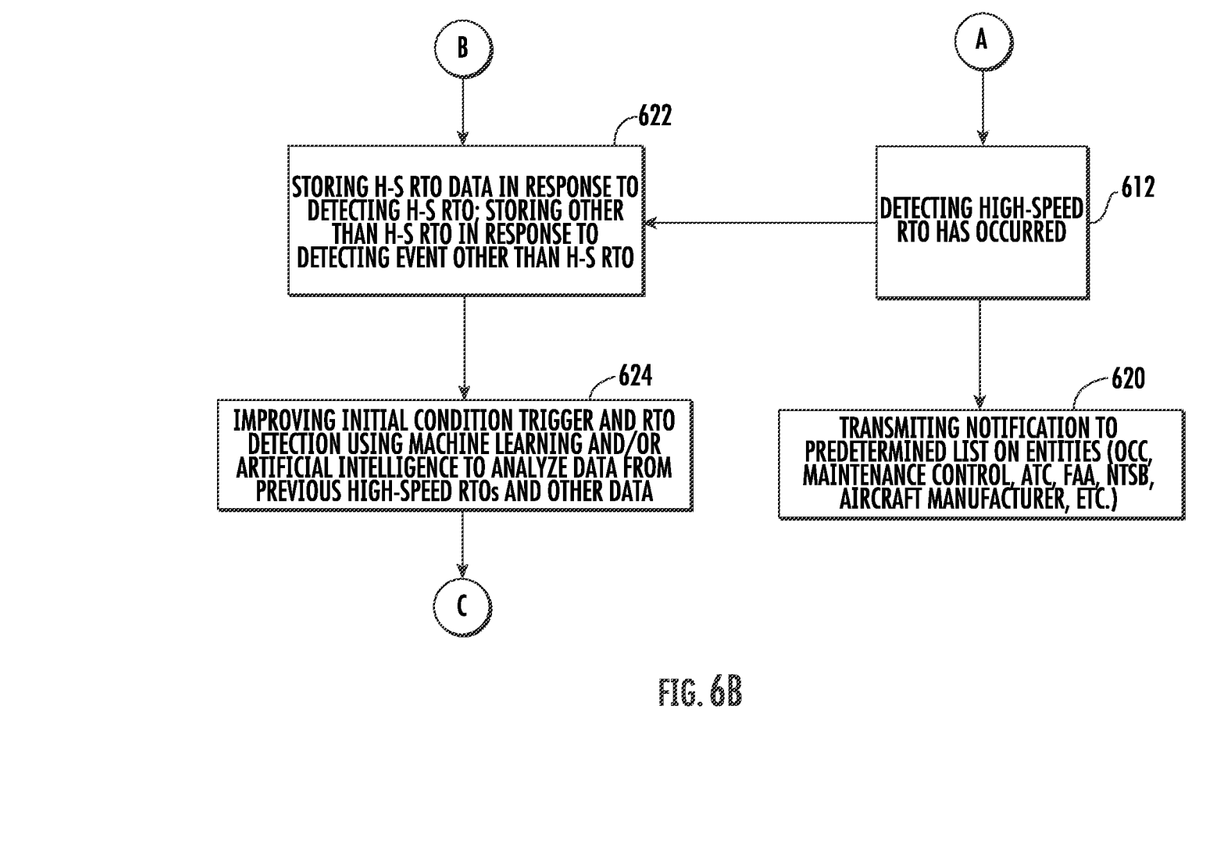

FIGS. 6A-6B are a flow chart of an example of a method 600 for high-speed rejected takeoff detection in accordance with an example of the present disclosure. As previously described, the method 600 is embodied in the module 126 or application 510 and includes the set of functions 508.

In block 602, the method 600 includes receiving input data 604. In some examples, receiving the input data 604 includes receiving aircraft location data 110, receiving wind speed and wind direction data 136, and receiving geospatial airport data 138 for an airport where the aircraft is located. In some examples, the aircraft location data 110 includes at least a current geographic location, a current altitude, a current velocity, and a current position timestamp of the aircraft. In some examples, the aircraft location data 110 also includes a flight identifier and the origin airport. The current velocity of the aircraft includes a current ground speed and direction of travel of the aircraft.

In some examples, receiving the aircraft location data 110 includes at least one of: receiving automatic dependent surveillance-broadcast (ADS-B) signals from the aircraft, wherein the ADS-B signals include the aircraft location data 110; receiving the aircraft location data 110 from a mobile device, e.g., mobile device 300 in FIG. 3, onboard the aircraft (in the cockpit); and receiving the aircraft location data 110 from a multilateration system, e.g., multilateration system 402 in FIG. 4.

In some examples, receiving the aircraft location data 110 includes receiving automatic dependent surveillance-broadcast (ADS-B) signals including the aircraft location data 110 from the aircraft and receiving additional signals from at least one of a mobile device onboard the aircraft and a multilateration system. The additional signals include additional aircraft location data that is used to improve the ADS-B signals, or at least one of the additional signals from the mobile device or the multilateration system are used alternatively to the ADS-B signals for the aircraft location data 110.

In block 606, the method 600 includes determining a current indicated airspeed (IAS) of the aircraft from the current ground speed and direction of the aircraft and the wind speed and wind direction data. The current indicated airspeed is approximately the ground speed of the aircraft minus the wind speed. At least the current indicated airspeed, direction of travel and position of the aircraft are received as input data in block 602 from block 606.

In block 608, the method 600 includes detecting an initial condition using the input data 604. In some examples, detecting the initial condition includes detecting the aircraft is on a runway polygon on the ground and starting to move with takeoff acceleration and determining the aircraft was on the ground a predetermined number of minutes prior to starting to move with takeoff acceleration. In some examples, as described herein, the predetermined number of minutes the aircraft is on the ground prior to starting to move with takeoff acceleration is determined statistically, for example, as approximately the taxi time from a particular location on the airport, e.g., a gate, ramp, hangar, etc. to the runway. An example of determining if the aircraft has started to move with takeoff acceleration is described below. If the initial condition is not detected in block 602, the method 600 returns to block 602 and the method 600 continues receiving input data 604 until detecting the initial condition. The method 600 advances to block 610 in response to detecting the initial condition.

In accordance with some examples, in block 608, the method 600 includes cross-correlating the position or geographic location of the aircraft with the geospatial airport data 138. The method 600 is able to detect whether the aircraft is located on a runway, e.g., the geographic location coordinates of the aircraft correspond within the runway coordinates of the airport. This includes determining whether the aircraft is on the ground by comparing the altitude of the aircraft with the runway altitude (or in case of ADS-B data directly using the on-ground flag provided in the ADS-B data streams). Additionally, the method 600 determines if the aircraft has been on ground for at least a predetermined number of minutes. In some examples, the predetermined number of minutes corresponds to approximately the lowest taxi time for the aircraft to taxi from a gate or parking stand to the runway. In some examples, the predetermined number of minutes or approximate lowest taxi time is determined from statistical data. If that is the case, then the method 600 or algorithm measures the delta speed of the aircraft to calculate its acceleration, e.g., every 1 second.

In accordance with an example, if the acceleration of the aircraft reaches a certain threshold value (for instance a typical initial value of takeoff acceleration from statistical data, e.g., greater than about 1 meter/second/second, depending on the aircraft type, aircraft configuration, runway configuration and conditions, environmental conditions, etc.) and the speed goes above a certain threshold value, e.g., about 10-20 knots IAS, then an initial condition timer is triggered and the method 600 advances to block 610 to determine if a high-speed rejected takeoff has occurred. If the initial condition is not triggered in block 608, the method 600 returns to block 602 to continue to receive input data.

In block 610, the method 600 includes determining whether or not a high-speed rejected takeoff has occurred. In block 612, the method 600 includes detecting a high-speed rejected takeoff has occurred by determining, in block 614, the aircraft has accelerated to at least a first preset indicated airspeed value and then by determining, in block 616, the aircraft has decelerated below at least a second preset indicated airspeed value and the aircraft is still on the ground. Determining the aircraft has accelerated to at least the first preset indicated airspeed value includes determining the aircraft has accelerated to at least the first preset indicated airspeed (IAS) value within a first preset time limit after the initial condition and the aircraft is on the ground. The first preset IAS value is determined using at least one of a size, type and configuration of the aircraft, and runway configuration and conditions. In accordance with some examples, the first preset IAS value is between about 80 knots and about 100 knots.

In block 614, after the initial condition is triggered in block 608, the method 600 monitors the speed of the aircraft and whether aircraft is still on ground. If the aircraft reaches a first preset IAS value, e.g., about 80-100 knots IAS, while on ground then the method 600 proceeds to block 616. If the aircraft has not reached the first preset IAS value within a first preset time limit from the triggering of the initial condition, no high-speed rejected takeoff has been detected, e.g., a low speed RTO has occurred and the method 600 advances to block 618. In some examples, the first preset time limit is estimated from statistical data calculating how much time it usually takes for an aircraft to go from the initial condition to about 80-100 knots IAS. However, this will depend on different factors, e.g., aircraft type, aircraft configuration, runway configuration and conditions, environmental conditions, etc. After a second preset time limit, the method 600 detects that the aircraft is no longer on the ground and no high-speed rejected takeoff is detected, e.g., the aircraft took off and the method 600 advances to block 618.

In block 618, the method 600 includes detecting an event other than the high-speed rejected takeoff has occurred, e.g., a low-speed rejected takeoff has occurred or the aircraft has taken off. The method 600 detects an event other than the high-speed rejected takeoff by determining, in block 614, the aircraft has not accelerated to at least the first preset indicated airspeed value, or by determining, in block 616, the aircraft has accelerated to at least the first preset indicated airspeed value and the aircraft has not decelerated below at least the second preset indicated airspeed value, or by determining the aircraft is airborne or taken off. Determining the aircraft has decelerated below at least the second preset indicated airspeed value includes determining the aircraft has decelerated below the second preset indicated airspeed value within a second preset time limit after the aircraft has accelerated to at least the first preset indicated airspeed value.

In block 616, after the aircraft has reached the first preset indicated airspeed value, e.g., between about 80-100 knots IAS, the method 600 determines if the aircraft starts to decelerate abruptly while on the ground and the speed of the aircraft goes below a second preset indicated airspeed value, e.g., below about 40-20 knots IAS within a second preset time limit after reaching the first present indicated airspeed value, then a high-speed rejected takeoff is detected by the method 600. If the condition is not met after the second preset time limit from the aircraft reaching the first preset indicated airspeed value, it means that no high-speed rejected takeoff has been detected and the method 600 advances to block 618.

In accordance with some examples, the second preset time limit is estimated from statistical data calculating how much time it usually takes an aircraft to go from the first preset indicated airspeed value to take off speed. The estimate of the second preset time limit will depend on different factors, e.g., aircraft type, aircraft configuration, runway configuration and conditions, environmental conditions, etc. Typical minimum values of high-speed rejected takeoff deceleration can be computed from statistical data. Values can also be determined from RTO historical data. After the expiration of the second preset time limit in block 616, the method 600 detects that the aircraft is no longer on the ground and no high-speed rejected is detected, e.g., the aircraft took off and the method 600 advances to block 618.

In block 620, the method 600 includes transmitting a high-speed rejected takeoff notification to a predetermined list of entities in response to detecting the high-speed rejected takeoff in block 612. As previously described, the predetermined list of entities includes, but is not necessarily limited to, air traffic control (ATC), airport emergency services, an operations control center (OCC) of an airline, maintenance control for the airline, aircraft manufacturer, government entities, e.g., in the United States, the Federal Aviation Administration (FAA), National Transportation Safety Board (NTSB), etc.

In block 622, the method 600 includes storing high-speed rejected takeoff data in response to detecting, in block 612, the high-speed rejected takeoff. In block 622, the method 600 also includes storing other than high-speed rejected takeoff data in response to detecting, in block 618, an event other than the high-speed rejected takeoff. All the historical data associated with the rejected takeoff, irrespective of whether a rejected takeoff was detected or not, are saved to a database, e.g., historical database 142 in FIG. 1, for improving the method or algorithm accuracy. Examples of the data saved include but are not necessarily limited to aircraft registration, airline, aircraft type, ground speeds, times, coordinates, track and the result of the RTO algorithm or method, e.g., a high-speed rejected takeoff was detected or an event other than a high-speed rejected takeoff was detected.

In block 624, the method 600 includes improving an initial condition trigger in block 608 and high-speed rejected takeoff detection in blocks 614 and 616 using machine learning and/or artificial intelligence to analyze the high-speed rejected takeoff data and the other than high-speed rejected takeoff data. During an initial deployment of the method and system described herein, false positives and false negatives may occur because of the preset time, speed, acceleration, and deceleration values used. These preset values in blocks 608, 614 and 616 are fine tunable during operation. This fine tuning/re-training process can be done at periodic intervals, e.g., weekly or monthly depending on traffic at a particular airport. The method or algorithm can then be redeployed. In order to further improve the accuracy, separate methods or algorithms may be deployed for separate aircraft types as well including different preset values. The re-training process can be stopped once the preset values stay more or less the same, e.g., the preset values reach a stable/saturation level.

Further, the disclosure comprises examples according to the following clauses:

Clause 1. A method, comprising:
detecting, by a processing circuit, a high-speed rejected takeoff has occurred by determining an aircraft has accelerated to at least a first preset indicated airspeed value and then by determining the aircraft has decelerated below at least a second preset indicated airspeed value and the aircraft is on the ground; and
detecting, by the processing circuit, an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne.

Clause 2. The method of clause 1, further comprising:
receiving input data associated with the aircraft; and
detecting an initial condition using the input data, wherein the initial condition is employed to facilitate one of the detecting the high-speed rejected takeoff or the detecting the event.

Clause 3. The method of any of clauses 1 or 2, wherein detecting the initial condition comprises:
detecting the aircraft is on a runway polygon on the ground and starting to move with takeoff acceleration; and
determining the aircraft was on the ground a predetermined number of minutes prior to starting to move.

Clause 4. The method of any of clauses 1-2 or 3, wherein receiving the input data comprises receiving at least one of aircraft location data associated with the aircraft, wind speed and wind direction data at a location of the aircraft, or geospatial data for an airport where the aircraft is located.

Clause 5. The method of any of clauses 1-3 or 4, wherein the aircraft location data comprises a current geographic location, a current altitude, a current velocity, and a current position timestamp of the aircraft, and wherein the current velocity of the aircraft comprises a current ground speed and direction of travel of the aircraft, and wherein the method further comprises determining a current indicated airspeed of the aircraft from the current ground speed of the aircraft and the wind speed and wind direction data.

Clause 6. The method of any of clauses 1-4 or 5, wherein receiving the aircraft location data comprises at least one of:
receiving automatic dependent surveillance-broadcast (ADS-B) signals from the aircraft, wherein the ADS-B signals comprise the aircraft location data;
receiving the aircraft location data from a mobile device onboard the aircraft; or
receiving the aircraft location data from a multilateration system.

Clause 7. The method of any of clauses 1-5 or 6, wherein receiving the aircraft location data comprises:
receiving automatic dependent surveillance-broadcast (ADS-B) signals from the aircraft, wherein the ADS-B signals comprise the aircraft location data; and
receiving additional signals from at least one of a mobile device onboard the aircraft and/or a multilateration system, wherein the additional signals comprise additional aircraft location data used to improve the ADS-B signals, or at least one of the additional signals from the mobile device or the multilateration system are used alternatively to the ADS-B signals for the aircraft location data.

Clause 8. The method of any of clauses 1-6 or 7, wherein determining the aircraft has accelerated to at least the first preset indicated airspeed value comprises determining the aircraft has accelerated to at least the first preset indicated airspeed value within a first preset time limit after an initial condition and the aircraft is on the ground.

Clause 9. The method of any of clauses 1-7 or 8, wherein the first preset indicated airspeed value is determined using at least one of a size of the aircraft, a type of the aircraft, a configuration of the aircraft, a runway configuration, or one or more runway conditions.

Clause 10. The method of any of clauses 1-8 or 9, wherein the first preset indicated airspeed value is between about 80 knots and about 100 knots.

Clause 11. The method of any of clauses 1-9 or 10, wherein determining the aircraft has decelerated below at least the second preset indicated airspeed value comprises determining the aircraft has decelerated below the second preset indicated airspeed value within a second preset time limit after the aircraft has accelerated to at least the first preset indicated airspeed value.

Clause 12. The method of any of clauses 1-10 or 11, further comprising transmitting a high-speed rejected takeoff notification to a determined list of entities in response to detecting the high-speed rejected takeoff.

Clause 13. The method of any of clauses 1-11 or 12, further comprising:
storing high-speed rejected takeoff data in response to detecting the high-speed rejected takeoff; and
storing other than high-speed rejected takeoff data in response to detecting the event other than the high-speed rejected takeoff.

Clause 14. The method of any of clauses 1-12 or 13, further comprising improving an initial condition trigger and high-speed rejected takeoff detection using at least one of machine learning or artificial intelligence to analyze the high-speed rejected takeoff data and the other than high-speed rejected takeoff data.

Clause 15. A system, comprising:
a processing circuit; and
a memory associated with the processing circuit, the memory comprising computer-readable program instructions that, when executed by the processing circuit causes the processing circuit to perform a set of functions comprising:
detecting a high-speed rejected takeoff has occurred by determining an aircraft has accelerated to at least a first preset indicated airspeed value and then by determining the aircraft has decelerated below at least a second preset indicated airspeed value and the aircraft is on the ground; and detecting an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne.

Clause 16. The system of clause 15, further comprising: receiving input data associated with the aircraft; and detecting an initial condition using the input data, wherein the initial condition is employed to facilitate one of the detecting the high-speed rejected takeoff or the detecting the event.

Clause 17. The system of any of clauses 15 or 16, wherein detecting the initial condition comprises:

detecting the aircraft is on a runway polygon on the ground and starting to move with takeoff acceleration; and determining the aircraft was on the ground a predetermined number of minutes prior to starting to move.

Clause 18. The system of any of clauses 15-16 or 17, wherein receiving the input data comprises at least one of receiving aircraft location data associated with the aircraft, receiving wind speed and wind direction data at a location of the aircraft, or receiving geospatial data for an airport where the aircraft is located.

Clause 19. The system of any of clauses 15-17 or 18, wherein the aircraft location data comprises a current geographic location, a current altitude, a current velocity, and a current position timestamp of the aircraft, and wherein the current velocity of the aircraft comprises a current ground speed and direction of travel of the aircraft, and wherein the method further comprises determining a current indicated airspeed of the aircraft from the current ground speed of the aircraft and the wind speed and wind direction data.

Clause 20. The system of any of clauses 15-18 or 19, wherein receiving the aircraft location data comprises at least one of:

receiving automatic dependent surveillance-broadcast (ADS-B) signals from the aircraft, wherein the ADS-B signals comprise the aircraft location data;

receiving the aircraft location data from a mobile device onboard the aircraft; and receiving the aircraft location data from a multilateration system.

Clause 21. The system of any of clauses 15-19 or 20, wherein receiving the aircraft location data comprises:

receiving automatic dependent surveillance-broadcast (ADS-B) signals from the aircraft, wherein the ADS-B signals comprise the aircraft location data; and receiving additional signals from at least one of a mobile device onboard the aircraft and/or a multilateration system, wherein the additional signals comprise additional aircraft location data used to improve the ADS-B signals, or at least one of the additional signals from the mobile device or the multilateration system are used alternatively to the ADS-B signals for the aircraft location data.

Clause 22. The system of any of clauses 15-20 or 21, wherein determining the aircraft has accelerated to at least the first preset indicated airspeed value comprises determining the aircraft has accelerated to at least the first preset indicated airspeed value within a first preset time limit after an initial condition and the aircraft is on the ground.

Clause 23. The system of any of clauses 15-21 or 22, wherein the first preset indicated airspeed value is determined using at least one of a size of the aircraft, a type of the aircraft, a configuration of the aircraft, a runway configuration, or one or more runway conditions.

Clause 24. The system of any of clauses 15-22 or 23, wherein the first preset indicated airspeed value is between about 80 knots and about 100 knots.

Clause 25. The system of any of clauses 15-23 or 24, wherein determining the aircraft has decelerated below at least the second preset indicated airspeed value comprises determining the aircraft has decelerated below the second preset indicated airspeed value within a second preset time limit after the aircraft has accelerated to at least the first preset indicated airspeed value.

Clause 26. The system of any of clauses 15-24 or 25, further comprising transmitting a high-speed rejected takeoff notification to a determined list of entities in response to detecting the high-speed rejected takeoff.

Clause 27. The system of any of clauses 15-25 or 26, further comprising:

storing high-speed rejected takeoff data in response to detecting the high-speed rejected takeoff; and storing other than high-speed rejected takeoff data in response to detecting the event other than the high-speed rejected takeoff.

Clause 28. The system of any of clauses 15-26 or 27, further comprising improving an initial condition trigger and high-speed rejected takeoff detection using at least one of machine learning or artificial intelligence to analyze the high-speed rejected takeoff data and the other than high-speed rejected takeoff data.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A method, comprising:
   detecting, by a processing circuit, a high-speed rejected takeoff has occurred by determining an aircraft has accelerated to at least a first preset indicated airspeed value and then by determining the aircraft has decelerated below at least a second preset indicated airspeed value and the aircraft is on the ground;
   detecting, by the processing circuit, an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne;
   receiving input data associated with the aircraft; and
   detecting an initial condition using the input data, wherein the initial condition is employed to facilitate one of the detecting the high-speed rejected takeoff or the detecting the event, wherein detecting the initial condition comprises:
      detecting the aircraft is on a runway polygon on the ground and starting to move with takeoff acceleration; and
      determining the aircraft was on the ground a predetermined number of minutes prior to starting to move.

2. The method of claim 1, wherein receiving the input data comprises receiving at least one of aircraft location data associated with the aircraft, wind speed and wind direction data at a location of the aircraft, or geospatial data for an airport where the aircraft is located.

3. A method comprising:
   detecting, by a processing circuit, a high-speed rejected takeoff has occurred by determining an aircraft has accelerated to at least a first preset indicated airspeed value and then by determining the aircraft has decelerated below at least a second preset indicated airspeed value and the aircraft is on the ground;
   detecting, by the processing circuit, an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne;
   receiving input data associated with the aircraft, wherein receiving the input data comprises receiving at least one of aircraft location data associated with the aircraft, wind speed and wind direction data at a location of the aircraft, or geospatial data for an airport where the aircraft is located; and
   detecting an initial condition using the input data, wherein the initial condition is employed to facilitate one of the detecting the high-speed rejected takeoff or the detecting the event,
   wherein the aircraft location data comprises a current geographic location, a current altitude, a current velocity, and a current position timestamp of the aircraft, and wherein the current velocity of the aircraft comprises a current ground speed and direction of travel of the aircraft, and wherein the method further comprises determining a current indicated airspeed of the aircraft from the current ground speed of the aircraft and the wind speed and wind direction data.

4. The method of claim 2, wherein receiving the aircraft location data comprises at least one of:
   receiving automatic dependent surveillance-broadcast (ADS-B) signals from the aircraft, wherein the ADS-B signals comprise the aircraft location data;
   receiving the aircraft location data from a mobile device onboard the aircraft; or
   receiving the aircraft location data from a multilateration system.

5. The method of claim 2, wherein receiving the aircraft location data comprises:
   receiving automatic dependent surveillance-broadcast (ADS-B) signals from the aircraft, wherein the ADS-B signals comprise the aircraft location data; and
   receiving additional signals from at least one of a mobile device onboard the aircraft or a multilateration system, wherein the additional signals comprise additional aircraft location data used to improve the ADS-B signals, or at least one of the additional signals from the mobile device or the multilateration system are used alternatively to the ADS-B signals for the aircraft location data.

6. The method of claim 1, wherein determining the aircraft has accelerated to at least the first preset indicated airspeed value comprises determining the aircraft has accelerated to at least the first preset indicated airspeed value within a first preset time limit after the initial condition and the aircraft is on the ground.

7. The method of claim 1, wherein the first preset indicated airspeed value is determined using at least one of a size of the aircraft, a type of the aircraft, a configuration of the aircraft, a runway configuration, or one or more runway conditions.

8. The method of claim 1, wherein the first preset indicated airspeed value is between about 80 knots and about 100 knots.

9. The method of claim 1, wherein determining the aircraft has decelerated below at least the second preset indicated airspeed value comprises determining the aircraft has decelerated below the second preset indicated airspeed value within a second preset time limit after the aircraft has accelerated to at least the first preset indicated airspeed value.

10. The method of claim 1, further comprising transmitting a high-speed rejected takeoff notification to a determined list of entities in response to detecting the high-speed rejected takeoff.

11. The method of claim 1, further comprising:
storing high-speed rejected takeoff data in response to detecting the high-speed rejected takeoff; and
storing other than high-speed rejected takeoff data in response to detecting the event other than the high-speed rejected takeoff.

12. A method comprising:
detecting, by a processing circuit, a high-speed rejected takeoff has occurred by determining an aircraft has accelerated to at least a first preset indicated airspeed value and then by determining the aircraft has decelerated below at least a second preset indicated airspeed value and the aircraft is on the ground;
storing high-speed rejected takeoff data in response to detecting the high-speed rejected takeoff;
detecting, by the processing circuit, an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne;
storing other than high-speed rejected takeoff data in response to detecting the event other than the high-speed rejected takeoff; and
improving an initial condition trigger and high-speed rejected takeoff detection using at least one of machine learning or artificial intelligence to analyze the high-speed rejected takeoff data and the other than high-speed rejected takeoff data.

13. A system, comprising:
a processing circuit; and
a memory associated with the processing circuit, the memory comprising computer-readable program instructions that, when executed by the processing circuit causes the processing circuit to perform a set of functions comprising:
receiving input data associated with the aircraft;
detecting an initial condition using the input data, wherein detecting the initial condition comprises:
detecting the aircraft is on a runway polygon on the ground and starting to move with takeoff acceleration; and
determining the aircraft was on the ground a predetermined number of minutes prior to starting to move;
detecting a high-speed rejected takeoff has occurred by determining an aircraft has accelerated to at least a first preset indicated airspeed value and then by determining the aircraft has decelerated below at least a second preset indicated airspeed value and the aircraft is on the ground; and
detecting an event other than the high-speed rejected takeoff has occurred by determining the aircraft has not accelerated to at least the first preset indicated airspeed value, or by determining the aircraft has accelerated to at least the first preset indicated airspeed value and the aircraft has not decelerated below at least the second preset indicated airspeed value, or by determining the aircraft is airborne.

14. The system of claim 13, wherein receiving the input data comprises at least one of:
receiving aircraft location data;
receiving a wind speed and wind direction data; or
receiving geospatial data for an airport where the aircraft is located.

15. The system of claim 14, wherein receiving the aircraft location data comprises:
receiving automatic dependent surveillance-broadcast (ADS-B) signals from the aircraft, wherein the ADS-B signals comprise the aircraft location data; and
receiving additional signals from at least one of a mobile device onboard the aircraft or a multilateration system, wherein the additional signals comprise additional aircraft location data used to improve the ADS-B signals, or at least one of the additional signals from the mobile device or the multilateration system are used alternatively to the ADS-B signals for the aircraft location data.

16. The system of claim 13, wherein determining the aircraft has accelerated to at least the first preset indicated airspeed value comprises determining the aircraft has accelerated to at least the first preset indicated airspeed value within a first preset time limit after an initial condition and the aircraft is on the ground.

17. The system of claim 13, wherein determining the aircraft has decelerated below at least the second preset indicated airspeed value comprises determining the aircraft has decelerated below the second preset indicated airspeed value within a second preset time limit after the aircraft has accelerated to at least the first preset indicated airspeed value.

18. The system of claim 13, wherein the memory comprises further computer-readable program instructions that, when executed by the processing circuit causes the processing circuit to perform a further set of functions comprising transmitting a high-speed rejected takeoff notification to a determined list of entities in response to detecting the high-speed rejected takeoff.

19. The system of claim 13, wherein the memory comprises further computer-readable program instructions that, when executed by the processing circuit causes the processing circuit to perform a further set of functions comprising improving an initial condition trigger and high-speed rejected takeoff detection using at least one of machine learning or artificial intelligence to analyze high-speed rejected takeoff data and other than high-speed rejected takeoff data.

20. The system of claim 13, wherein the aircraft location data comprises a current geographic location, a current altitude, a current velocity, and a current position timestamp of the aircraft, and wherein the current velocity of the aircraft comprises a current ground speed and direction of travel of the aircraft, and wherein the memory comprises further computer-readable program instructions that, when executed by the processing circuit causes the processing circuit to perform a further set of functions comprising determining a current indicated airspeed of the aircraft from the current ground speed of the aircraft and the wind speed and wind direction data.

* * * * *